United States Patent
Hennessey et al.

(10) Patent No.: US 11,459,035 B1
(45) Date of Patent: Oct. 4, 2022

(54) SHOCK ABSORBER ASSEMBLY STRUCTURES

(71) Applicant: Ford Global Technologies, LLC, Dearborn, MI (US)

(72) Inventors: Conor Daniel Hennessey, Dearborn, MI (US); Vladimir Vladimirovich Bogachuk, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/203,188

(22) Filed: Mar. 16, 2021

(51) Int. Cl.
*B62D 25/08* (2006.01)
*B60G 13/00* (2006.01)

(52) U.S. Cl.
CPC .......... *B62D 25/088* (2013.01); *B60G 13/003* (2013.01); *B60G 2204/128* (2013.01)

(58) Field of Classification Search
CPC ...... B60G 2204/1242; B60G 2204/126; B60G 2204/12; B60G 2204/10; B60G 13/005; B60G 7/001; B60G 2204/128; B60G 13/003; F16F 9/54; B62D 21/11; B62D 25/088

See application file for complete search history.

(56) References Cited

U.S. PATENT DOCUMENTS

| | | | | |
|---|---|---|---|---|
| 3,580,611 A * | 5/1971 | McNitt | ............... | B62D 53/0807 280/433 |
| 4,971,484 A * | 11/1990 | Specktor | ............... | B62D 65/12 33/642 |
| 6,047,988 A * | 4/2000 | Aloe | ............... | B60G 7/02 280/788 |
| 6,244,607 B1 * | 6/2001 | Nishino | ............... | B60G 3/06 280/124.152 |
| 6,592,112 B2 * | 7/2003 | Bishop | ............... | F16F 9/54 188/321.11 |
| 6,712,370 B2 * | 3/2004 | Kawada | ............... | F16B 37/065 411/183 |
| 6,843,352 B2 * | 1/2005 | Jacoby | ............... | F16F 3/093 267/209 |
| 10,894,457 B2 * | 1/2021 | Galazin | ............... | B60G 9/003 |
| 2005/0006868 A1 * | 1/2005 | Ziech | ............... | B60G 13/001 280/124.106 |

(Continued)

FOREIGN PATENT DOCUMENTS

| | | | | |
|---|---|---|---|---|
| CN | 106627768 | | 5/2017 | |
| DE | 19633815 A1 * | | 8/1997 | ........... B60G 11/465 |

(Continued)

*Primary Examiner* — James A Shriver, II
*Assistant Examiner* — Maxwell L Meshaka
(74) *Attorney, Agent, or Firm* — Gregory Brown; Hanley, Flight & Zimmerman LLC

(57) ABSTRACT

Shock absorber assembly structures are disclosed. An example apparatus disclosed herein includes a body of a vehicle having a first longitudinal structural member adjacent a wheel arch area of the body, a first locating rib integrally formed in the first longitudinal structural member to position a shock absorber of a chassis of the vehicle during assembly of the vehicle body to the chassis, and a first attachment boss integrally formed in the first longitudinal structural member adjacent to the first locating rib to receive a first fastener to fasten the shock absorber to the body.

19 Claims, 6 Drawing Sheets

(56) References Cited

U.S. PATENT DOCUMENTS

| | | | | |
|---|---|---|---|---|
| 2005/0173883 A1* | 8/2005 | Mayenburg | ............ | B60G 9/003 |
| | | | | 280/124.107 |
| 2009/0072505 A1* | 3/2009 | McGinnis | .............. | B60G 9/003 |
| | | | | 280/124.116 |
| 2010/0094503 A1* | 4/2010 | Li | ........................ | B60G 13/001 |
| | | | | 280/5.514 |
| 2011/0266765 A1* | 11/2011 | Nowak | .................. | B60G 11/16 |
| | | | | 280/124.154 |
| 2011/0309594 A1 | 12/2011 | Zohar | | |
| 2021/0061368 A1* | 3/2021 | Satoh | ..................... | B62D 25/02 |

FOREIGN PATENT DOCUMENTS

| | | | | |
|---|---|---|---|---|
| KR | 101220807 | | 1/2013 | |
| WO | WO-2018042737 A1 * | | 3/2018 | ........... B62D 25/087 |

* cited by examiner

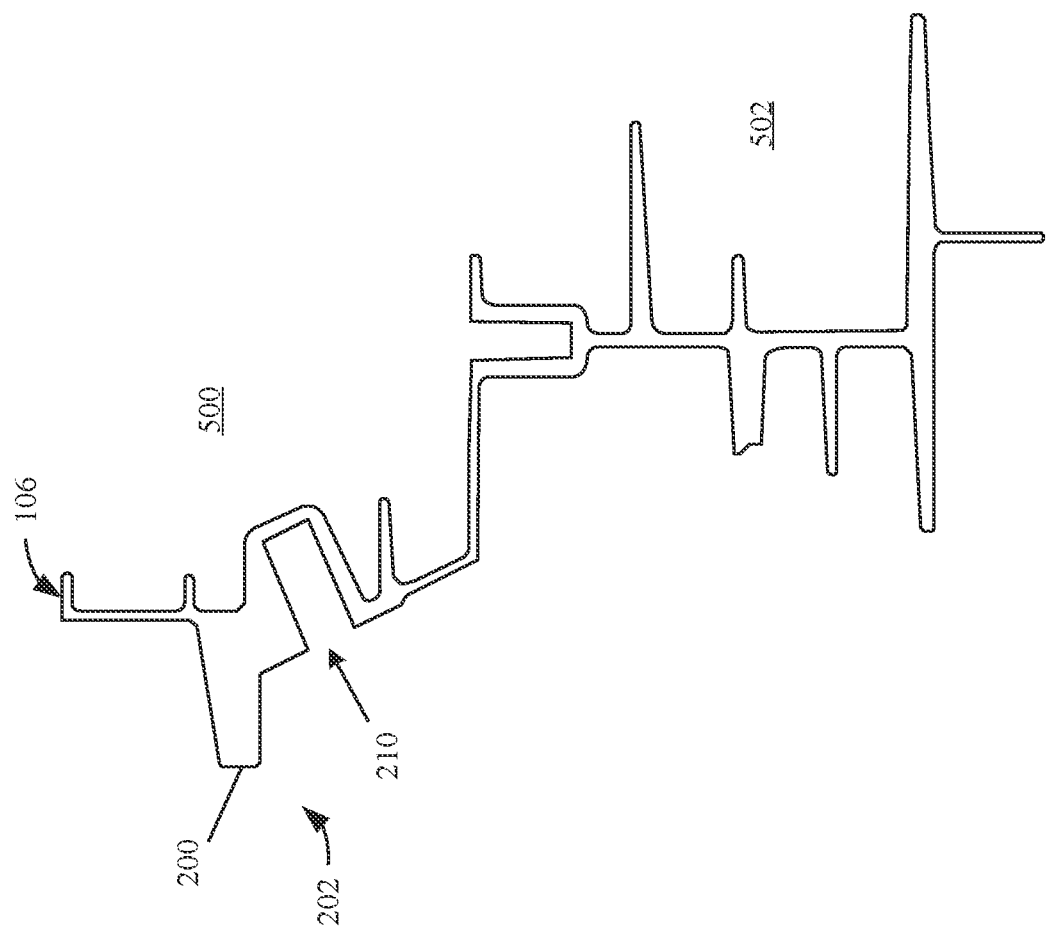

… (1)

SHOCK ABSORBER ASSEMBLY STRUCTURES

FIELD OF THE DISCLOSURE

This disclosure relates generally to vehicles and, more particularly, to shock absorber assembly structures.

BACKGROUND

A vehicle suspension typically includes a spring and a damper, such as a shock absorber or a strut. A damper may be mounted, for example, between a lower control arm and the chassis. Shock absorbers are used with vehicle suspension systems to dampen undesirable oscillations of the suspension system caused by irregularities of a road surface.

SUMMARY

An example apparatus includes a body of a vehicle having a first longitudinal structural member adjacent a wheel arch area of the body. A first locating rib is integrally formed in the first longitudinal structural member to position a shock absorber of a chassis of the vehicle during assembly of the body to the chassis. A first attachment boss is integrally formed in the first longitudinal structural member adjacent to the first locating rib to receive a first fastener to fasten the shock absorber to the body.

An example apparatus includes a vehicle body including an integrally formed protrusions spaced apart on a portion of the vehicle body adjacent a wheel opening and extending outwardly from a surface of the portion of the vehicle body, and a shock absorber mount having a recess to receive the protrusions during assembly of a vehicle having the vehicle body to facilitate attachment of a shock absorber to the portion of the vehicle body.

An example method includes coupling a first longitudinal structural member to a body of a vehicle adjacent a wheel arch area of the body, integrally forming a first locating rib in the first longitudinal structural member, the first locating rib to position a shock absorber of a chassis of the vehicle during assembly of the body to the chassis, and integrally forming a first attachment boss in the first longitudinal structural member adjacent to the first locating rib, the first attachment boss to receive a first fastener to fasten the shock absorber to the body.

BRIEF DESCRIPTION OF THE DRAWINGS

FIG. 5 is a cross-sectional view of the example first longitudinal structural member implementing the example positioner of FIG. 4B.

Figure 1:
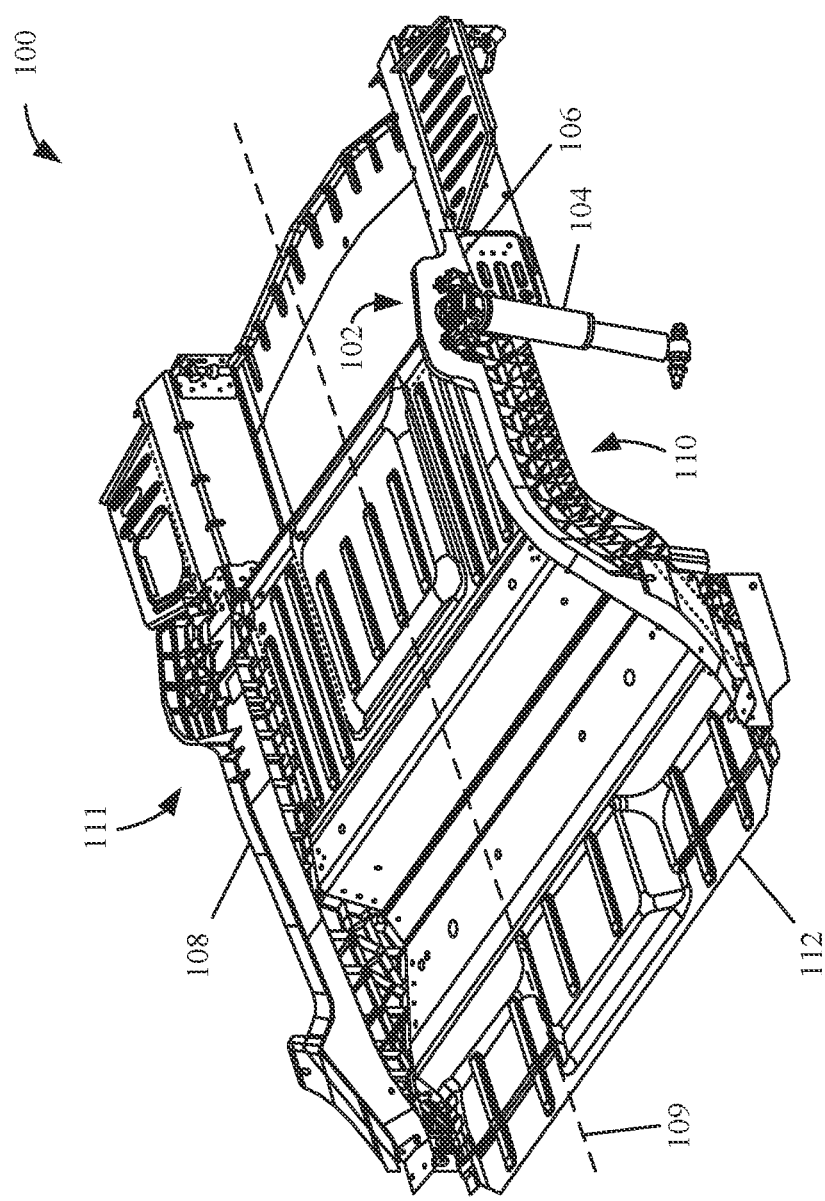
FIG. 1 illustrates an example vehicle body including an example positioner and coupled to an example shock absorber.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Vehicular suspension systems typically include dampers to absorb relative displacement between a wheel assembly or vehicle chassis and a vehicle body. Such dampers may include shock absorbers and struts in combination with springs. In some examples, the shock absorber is coupled to a rear of the vehicle body using a mounting device. In particular, the mounting device is a structure for positioning the shock absorber relative to the vehicle body during assembly of the vehicle chassis and the vehicle body.

During vehicle assembly, the vehicle body and the vehicle chassis are typically assembled independently, and then decked together on a main assembly line. During a decking process, shock absorbers are compressed prior to attachment of the vehicle chassis to the vehicle body. To attach the shock absorbers to the vehicle body, holes in a shock mount of each shock absorber are aligned with corresponding attachment points on the vehicle body. The shock absorbers and the vehicle body are coupled via bolts through the holes and the attachment points. In some known solutions, the attachment points are implemented using weld-on nuts on the vehicle body and aligned during assembly via separate weld-on studs or brackets on the vehicle body. However, addition of weld-on studs on the vehicle bed may increase a tolerance between the shock mount of the shock absorber and the weld-on nuts. Such increases in tolerance may result in misalignment between the attachment points and the shock mount and, thus, an inability to attach the shock absorbers to the vehicle body. In some cases, the brackets are composed of a different material than the vehicle body. For example, the brackets may be composed of steel, and the portion of the vehicle body to which the brackets are to be attached may be aluminum. In some such cases, the direct coupling of different materials can increase a risk of corrosion between the different materials. Additionally, use of weld-on studs or brackets can increase cost and weight of the vehicle body.

Examples disclosed herein are directed to an integrated positioner for a damper (e.g., shock absorber). An example vehicle body disclosed herein includes a longitudinal structural member adjacent a wheel arch area. Examples disclosed herein include one or more ribs located above respective shock absorber attachment bosses on the longitudinal structural member. The example ribs engage with corresponding concave surfaces or "V" shaped seats in shock absorber mounts during assembly of the vehicle body to a chassis of the vehicle. As such, the ribs prevent upward movement of the shock absorber beyond the ribs and compress the shock absorbers during assembly. The ribs and the corresponding "V" shaped seats in the shock absorber mounts enable alignment of the shock absorber and the vehicle body during assembly. Accordingly, such alignment allows a bolted joint to be fastened to the shock absorber attachment bosses. In examples disclosed herein, the ribs are integrally formed in the longitudinal structural members of the vehicle body. As such, the integrated ribs reduce a need for additional parts (e.g., such as weld-on bolts and/or brackets) for positioning the shock absorbers and, thus, the ribs reduce a tolerance between the shock absorber attachment bosses and the shock absorber mounts. Furthermore, integrally forming the ribs in the longitudinal structural members of the vehicle body reduces corrosion that may be caused by coupling one or more different materials.

FIG. 1 illustrates an example vehicle body 100 including an example positioner (e.g., shock absorber positioner, shock absorber locator) 102 and coupled to an example shock absorber 104. In some examples, the vehicle body 100 forms a floor of a vehicle. The vehicle body 100 further includes a first longitudinal structural member (e.g., a first longitudinal member, a first rail) 106 and a second longitudinal structural member (e.g., a second longitudinal member, a second rail) 108 on opposite sides of the vehicle body 100, where the first and second longitudinal structural members 106, 108 are portions of the vehicle body 100. In this example, the first and second longitudinal structural members 106, 108 are metal components of the vehicle body 100. In this example, the second longitudinal structural member 108 is a mirror image of the first longitudinal structural member 106 across an example longitudinal axis 109 of the vehicle body 100. As such, while examples disclosed herein are described in connection with the first longitudinal structural member 106, examples disclosed herein can be similarly described in connection with the second longitudinal structural member 108. In other examples, the second longitudinal structural member 108 can have different geometry relative to the first longitudinal structural member 106.

In some examples, the first and second longitudinal structural members 106, 108 are adjacent example respective wheel arch areas 110, 111 of the vehicle body 100. For example, when the vehicle is assembled, wheels are coupled to the vehicle proximate the example wheel arch areas 110, 111. In the illustrated example of FIG. 1, an example floor assembly 112 of the vehicle body 100 is coupled between the first and second longitudinal structural members 106, 108. In some examples, the first and second longitudinal structural members 106, 108 are aluminum castings. In other examples, a different material for the first and second longitudinal structural members 106, 108 may be used. In the illustrated example of FIG. 1, the positioner 102 is integrally formed in the first longitudinal structural member 106 via casting. In this example, the positioner 102 aligns and compresses the shock absorber 104 during a vehicle assembly process (e.g., when coupling the vehicle body 100 to a chassis of the vehicle). In some examples, the positioner 102 is manufactured via additive manufacturing. In some examples, positioner 102 is constructed of the same materials as the first and second longitudinal structural members 106, 108.

Figure 2:
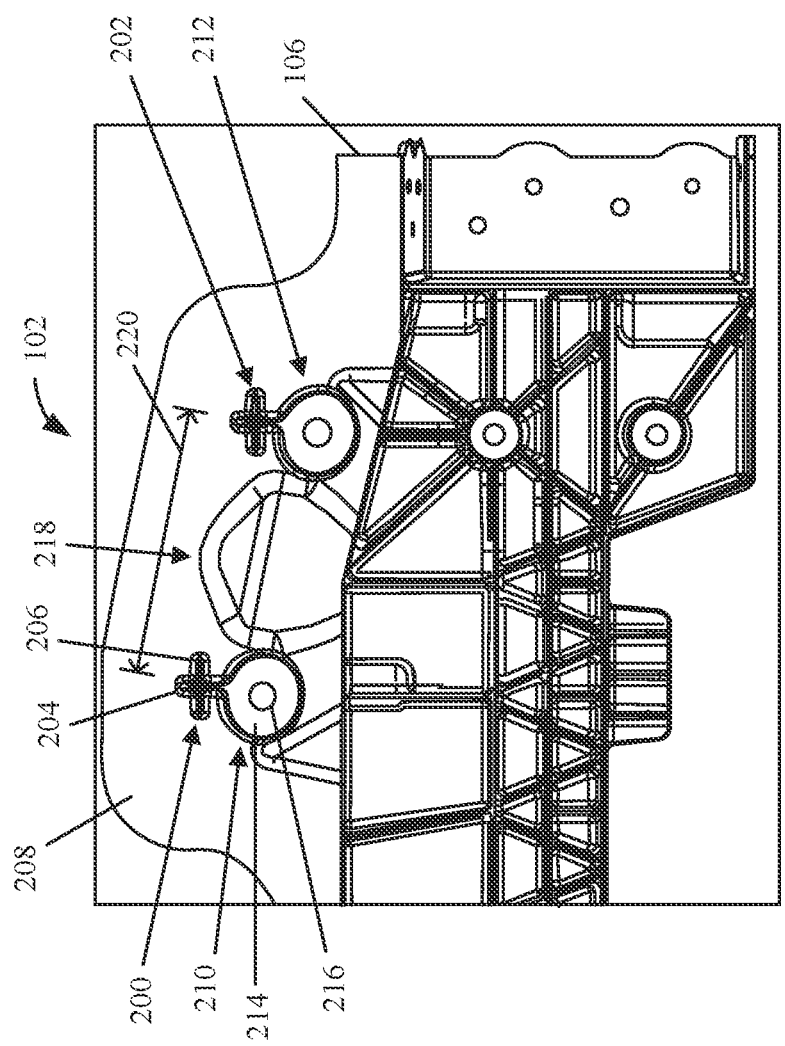
FIG. 2 illustrates the example positioner of FIG. 1 implemented on an example first longitudinal structural member of the vehicle body.

FIG. 2 illustrates the example positioner 102 of FIG. 1 implemented on the first longitudinal structural member 106. In the illustrated example of FIG. 2, the positioner 102 includes an example first locating rib (e.g., a first protrusion) 200 and an example second locating rib (e.g., a second protrusion) 202 integrally formed in the first longitudinal structural member 106. In this example, the first and second locating ribs 200, 202 are metal components of the vehicle body 100. In some examples, the first and second locating ribs 200, 202 are integrally formed in the first longitudinal structural member 106 during an additive manufacturing process. In some examples, the first and second locating ribs 200, 202 are formed during casting of the first longitudinal structural member 106. In the illustrated example of FIG. 2, the first locating rib 200 includes example first and second portions 204, 206 that extend outward from an example member surface 208 of the first longitudinal structural member 106. In some examples, the first portion 204 is perpendicular to the second portion 206, such that the first locating rib 200 has a cross-shaped cross-section. In this example, the first locating rib 200 extends outward from the example member surface 208 in a direction that is generally perpendicular to the longitudinal axis 109 of FIG. 1. In examples disclosed herein, the second locating rib 202 has substantially the same geometry as the first locating rib 200.

The first longitudinal structural member 106 further includes an example first attachment boss 210 and an example second attachment boss 212 integrally formed in the first longitudinal structural member 106 adjacent to the first locating rib 200 and the second locating rib 202. In particular, the first locating rib 106 is disposed adjacent and above the first attachment boss 210, and the second locating rib 202 is disposed adjacent and above the second attachment boss 212. In some examples, the first and second attachment bosses 210, 212 are formed in the first longitudinal structural member 106 during an additive manufacturing process. In other examples, the first and second attachment bosses 210, 212 are formed during casting of the first longitudinal structural member 106.

In the illustrated example of FIG. 2, the first attachment boss 210 includes an example surface 214 and an example opening 216. In some examples, the surface 214 is angled relative to the member surface 208 of the first longitudinal structural member 106. In the illustrated example, an example cavity 218 is formed in the first longitudinal structural member 106 to receive a portion of the shock absorber 104 of FIG. 1. In some examples, the positioner 102 is a means for positioning a shock absorber during vehicle assembly, or a positioning means. In some examples, the positioning means includes the first locating rib 200 and the first attachment boss 210. In some examples, the positioning means is formed in a surface of the first longitudinal structural member 106.

In the illustrated example of FIG. 2, the second locating rib 202 has substantially the same geometry as the first locating rib 200, and the second attachment boss 212 has substantially the same geometry as the first attachment boss 210. In this example, the second locating rib 202 and the second attachment boss 212 are spaced from the corresponding first locating rib 200 and the first attachment boss 210 by an example distance 220. In some examples, the distance 220 is based on a corresponding dimension of the shock absorber 104 of FIG. 1. While the first and second locating ribs 202 and the first and second attachment bosses 210, 212 are implemented on the first longitudinal structural member 106 in this example, the first and second locating ribs 202 and the first and second attachment bosses 210, 212 can similarly be implemented on the second longitudinal structural member 108 of FIG. 1 as well as a front suspension area of a vehicle.

Figure 3A:
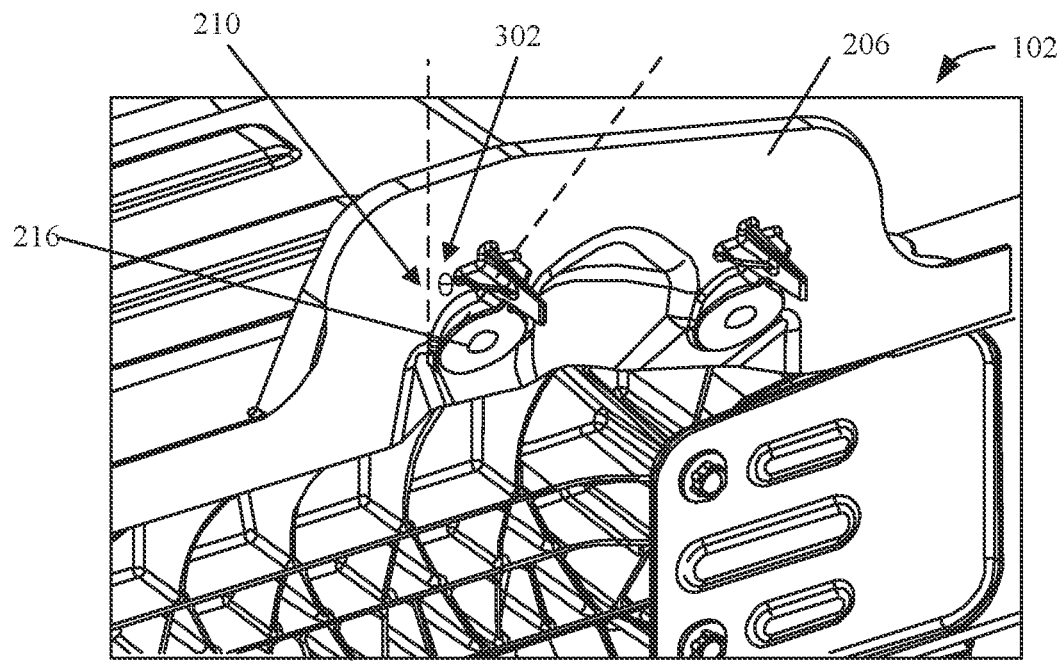
FIG. 3A illustrates a side view of the example positioner implemented on the example first longitudinal structural member of FIG. 2.

FIG. 3A illustrates a side view of the example positioner 102 implemented on the example first longitudinal structural member 106. In the illustrated example of FIG. 3A, the first attachment boss 210 is at an example first angle 302 relative to the member surface 208 of the first longitudinal structural member 106. However, the first attachment boss 210 can be at a different angle based on a geometry and/or a desired orientation of the shock absorber 104 relative to the vehicle body 100. In some examples, an angled surface of the shock absorber corresponds to the first angle 302 of the attachment boss 210.

Figure 3B:
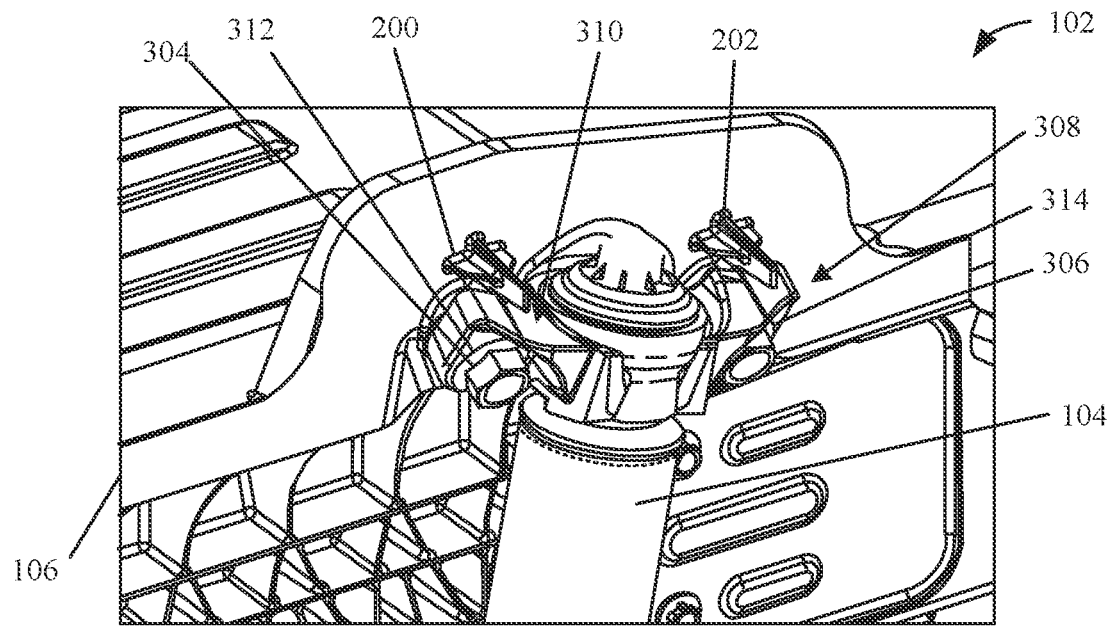
FIG. 3B illustrates the example shock absorber coupled to the example first longitudinal structural member of FIG. 3A.

FIG. 3B illustrates the shock absorber 104 coupled to the first longitudinal structural member 106. In this example, the first and second locating ribs 200, 202 are used to position the shock absorber 104 during assembly of the vehicle body 100 of FIG. 1 to a vehicle chassis. Furthermore, the first and second attachment bosses 210, 212 are to receive an example first fastener 304 and an example second fastener 306 to fasten the shock absorber 104 to the vehicle body 100.

The shock absorber 104 of the illustrated example includes an example shock absorber mount (e.g., upper mount) 308. In the illustrated example of FIG. 3B, the shock absorber mount 308 is proximate a top portion of the shock absorber 104. The example shock absorber mount 308 includes an example recess 310 for receiving the first and second locating ribs 200, 202. In some examples, the first locating rib 200 is a first shape and the recess 310 is a second shape that is complimentary to the first shape. In some examples, the recess 310 is an angled and/or concave surface of the shock absorber mount 308. In this example, the first locating and second ribs 200, 202 have cross-shaped cross-sections, and the recess 310 forms a complimentary "V" shape to receive the locating ribs 200, 202. As such, during assembly of the a vehicle chassis to the vehicle body 100 of FIG. 1, the locating ribs 200, 202 engage the recess 310 to facilitate compression and positioning of the shock absorber 104.

The example shock absorber mount 308 further includes an example first aperture 312 and an example second aperture 314 to receive the first fastener 304 and the second fastener 306, respectively. In the illustrated example, the first fastener 304 passes through the first aperture 312 of the shock absorber mount 308 and the opening 216 of the first attachment boss 210 to couple and/or fix the shock absorber 104 to the first longitudinal structural member 106. Similarly, the second fastener 306 passes through the second aperture of the shock absorber mount 308 and a corresponding opening in the second attachment boss 212 to couple the shock absorber 104 to the first longitudinal structural member 106. In some examples, the first and second fasteners 304, 306 couple the shock absorber mount 308 to the first longitudinal structural member 106 after the first and second locating ribs 200, 202 have been used to compress and position the shock absorber 104, such that the shock absorber 104 is substantially aligned with the first longitudinal structural member 106. In particular, the shock absorber 104 is substantially aligned with the first longitudinal structural member 106 when the opening 216 of the first attachment boss 210 is substantially aligned with the first aperture 312 of the shock absorber mount 308. In some examples, the shock absorber mount 308 is a means for compressing a shock absorber during a vehicle assembly, or a compressing means. In some examples, the compressing means includes the recess 310 to receive the positioning means (e.g., the first locating rib 200). In some examples, the compressing means is coupled to a top portion a vehicle damper (e.g., the shock absorber 104).

Figure 4A:
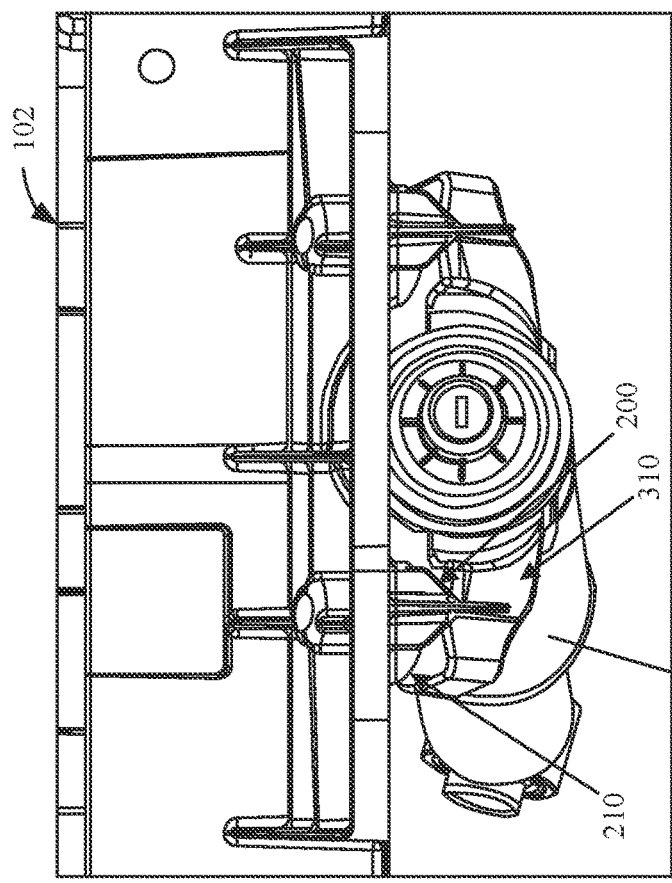
FIG. 4A illustrates a side view of the example positioner and the example shock absorber of FIG. 3B without example first and second fasteners.
Figure 4B:
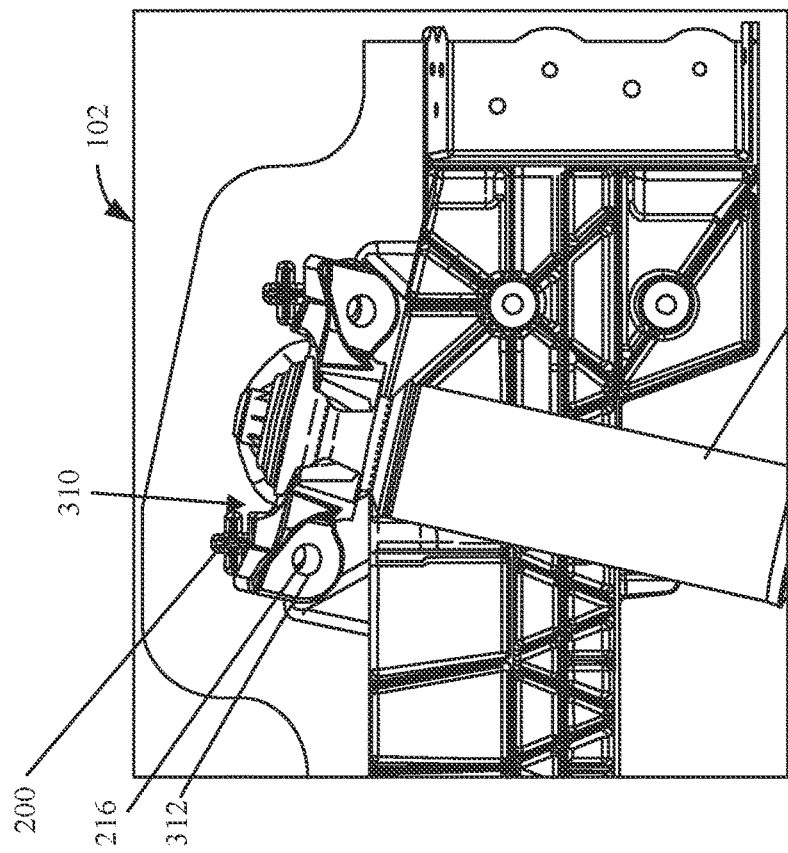
FIG. 4B illustrates a top view of the example positioner and the example shock absorber of FIG. 3B without the example first and second fasteners.

FIGS. 4A and 4B illustrate a side view and a top view, respectfully, of the example positioner 102 and the example shock absorber 104 without the first and second fasteners 304, 306 of FIG. 3B. In the illustrated examples of FIGS. 4A and 4B, when the first locating rib 200 engages with the recess 310, the angled surface of the recess 310 facilitates alignment of the first aperture 312 of the shock absorber mount 308 with the opening 216 of the first attachment boss 210. In some examples, the first aperture 312 and the opening 216 have substantially the same cross-sectional shape and dimensions.

FIG. 5 is a cross-sectional view of the example first longitudinal structural member 106 implementing the example positioner 102. In the illustrated example of FIG. 5, the positioner 102 includes the first locating rib 200 and the first attachment boss 210 located at a first portion 500 of the first longitudinal structural member 106. In this example, the first locating rib 200 and the first attachment boss 210 are integrally formed in the first longitudinal structural member 106 during casting, such that the first longitudinal structural member 106, the first locating rib 200, and the first attachment boss 210 are a single component. In this example, the casting of the first longitudinal structural member 106 may include additional grooves and/or protrusions on an example second portion 502 of the first longitudinal structural member 106 for coupling the first longitudinal structural member 106 to a frame of a vehicle. In the illustrated example of FIG. 5, the first portion 500 of the first longitudinal structural member 106 is angled relative to the second portion 502 to extend the first locating rib 200 and the first attachment boss 210 outward from the frame of the vehicle, thus reducing the possibility of damage to the shock absorber 104 during vehicle assembly.

Figure 6:
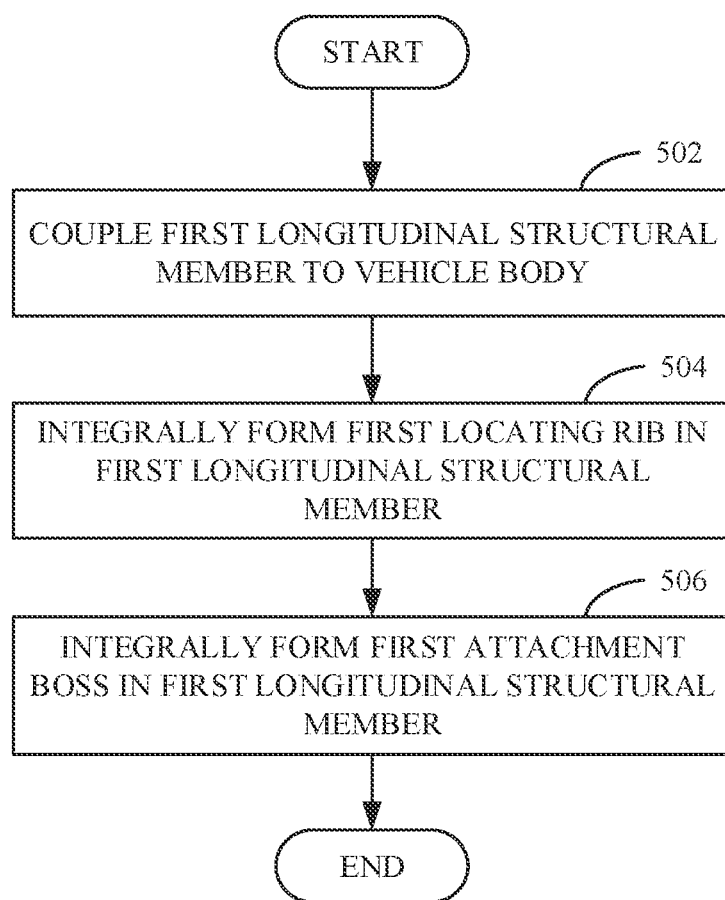
FIG. 6 is a flowchart representative of an example method to produce examples enclosed herein.

FIG. 6 is a flowchart representative of an example method 600 to produce examples enclosed herein. For example, the example method 600 can be executed to produce the positioner 102 implemented on the vehicle body 100 of FIG. 1. The example method 600 of FIG. 6 begins at block 602, at which the first longitudinal structural member 106 is coupled to the vehicle body 100.

At block 604, the first locating rib 200 is integrally formed in the first longitudinal structural member 106. Additionally, in some examples, the second locating rib 202 is integrally formed in the first longitudinal structural member 106 spaced from the first locating rib 200.

At block 606, the first attachment boss 210 is integrally formed in the first longitudinal structural member 106. In particular, the first attachment boss 210 is disposed adjacent the first locating rib 200. Additionally, in some examples, the second attachment boss 212 is integrally formed in the first longitudinal structural member 106 spaced from the first attachment boss 210.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide a new configuration for a vehicle shock absorber. The disclosed examples enable assembly of the vehicle shock absorber with fewer parts because the examples described herein no longer require separate components coupled to a vehicle body, thus resulting in a cost reduction and a weight reduction. Further, elimination of the separate components, such as brackets or weld-on studs, etc., improves alignment of the shock absorber relative to the vehicle body.

Example 1 includes an apparatus including a body of a vehicle having a first longitudinal structural member adjacent a wheel arch area of the body, a first locating rib integrally formed in the first longitudinal structural member to position a shock absorber of a chassis of the vehicle during assembly of the body to the chassis, and a first attachment boss integrally formed in the first longitudinal structural member adjacent to the first locating rib to receive a first fastener to fasten the shock absorber to the body.

Example 2 includes the apparatus of Example 1, where the first longitudinal structural member is a metal component of the body.

Example 3 includes the apparatus of Example 1, where the first locating rib extends outwardly from the first longitudinal structural member and generally perpendicular to a longitudinal axis of the vehicle.

Example 4 includes the apparatus of Example 1, and further includes a second locating rib integrally formed in the first longitudinal structural member and spaced from the first locating rib, the first and second locating ribs to position the shock absorber during assembly of the body to the chassis.

Example 5 includes the apparatus of Example 1, and further includes a second attachment boss integrally formed in the first longitudinal structural member spaced from the first attachment boss, the second attachment boss to receive a second fastener to fasten the shock absorber to the body.

Example 6 includes the apparatus of Example 1, where the first locating rib is disposed adjacent and above the first attachment boss.

Example 7 includes the apparatus of Example 1, where the shock absorber includes an upper mount having an angled surface to contact the first locating rib to position the shock absorber during assembly of the body to the chassis.

Example 8 includes the apparatus of Example 1, where the first locating rib has a cross-shaped cross-section.

Example 9 includes the apparatus of Example 1, where the first longitudinal structural member is coupled to a floor assembly of the body.

Example 10 includes the apparatus of Example 1, and further includes a second longitudinal structural member of the body, the second longitudinal structural member including a second locating rib and a second attachment boss.

Example 11 includes an apparatus including a vehicle body including an integrally formed protrusions spaced apart on a portion of the vehicle body adjacent a wheel opening and extending outwardly from a surface of the portion of the vehicle body, and a shock absorber mount having a recess to receive the protrusions during assembly of a vehicle having the vehicle body to facilitate attachment of a shock absorber to the portion of the vehicle body.

Example 12 includes the apparatus of Example 11, where the portion of the vehicle body includes attachment bosses to receive fasteners to fix the shock absorber to the portion of the vehicle body.

Example 13 includes the apparatus of Example 12, where the shock absorber mount further includes apertures to receive fasteners, the fasteners to be coupled to the attachment bosses to attach the shock absorber to the portion of the vehicle body.

Example 14 includes the apparatus of Example 11, where the portion of the vehicle body is a longitudinal structural member.

Example 15 includes the apparatus of Example 14, where the longitudinal structural member is coupled to a floor assembly of the vehicle.

Example 16 includes the apparatus of Example 11, where the protrusions are ribs extending outwardly and substantially perpendicular to a longitudinal axis of the vehicle body.

Example 17 includes a method including coupling a first longitudinal structural member to a body of a vehicle adjacent a wheel arch area of the body, integrally forming a first locating rib in the first longitudinal structural member, the first locating rib to position a shock absorber of a chassis of the vehicle during assembly of the body to the chassis, and integrally forming a first attachment boss in the first longitudinal structural member adjacent to the first locating rib, the first attachment boss to receive a first fastener to fasten the shock absorber to the body.

Example 18 includes the method of Example 17, and further includes integrally forming a second locating rib in the first longitudinal structural member and spaced from the first locating rib, the first and second locating ribs to position the shock absorber during assembly of the body to the chassis.

Example 19 includes the method of Example 17, and further includes integrally forming a second attachment boss in the first longitudinal structural member spaced from the first attachment boss, the second attachment boss to receive a second fastener to fasten the shock absorber to the body.

Example 20 includes the method of Example 17, and further includes disposing the first locating rib adjacent and above the first attachment boss.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a body of a vehicle having a first longitudinal structural member adjacent a wheel arch area of the body;
   a first locating rib integrally formed in the first longitudinal structural member to position a shock absorber of a chassis of the vehicle during assembly of the body to the chassis; and
   a first attachment boss integrally formed in the first longitudinal structural member adjacent to the first locating rib to receive a first fastener to fasten the shock absorber to the body.

2. The apparatus of claim 1, wherein the first longitudinal structural member is a metal component of the body.

3. The apparatus of claim 1, wherein the first locating rib extends outwardly from the first longitudinal structural member and generally perpendicular to a longitudinal axis of the vehicle.

4. The apparatus of claim 1, further including a second locating rib integrally formed in the first longitudinal structural member and spaced from the first locating rib, the first and second locating ribs to position the shock absorber during assembly of the body to the chassis.

5. The apparatus of claim 1, further including a second attachment boss integrally formed in the first longitudinal structural member spaced from the first attachment boss, the second attachment boss to receive a second fastener to fasten the shock absorber to the body.

6. The apparatus of claim 1, wherein the first locating rib is disposed adjacent and above the first attachment boss.

7. The apparatus of claim 1, wherein the shock absorber includes an upper mount having an angled surface to contact the first locating rib to position the shock absorber during assembly of the body to the chassis.

8. The apparatus of claim 1, wherein the first locating rib has a cross-shaped cross-section.

9. The apparatus of claim 1, wherein the first longitudinal structural member is coupled to a floor assembly of the body.

10. The apparatus of claim 1, further including a second longitudinal structural member of the body, the second longitudinal structural member including a second locating rib and a second attachment boss.

11. An apparatus comprising:
    a vehicle body including integrally formed protrusions spaced apart on a portion of the vehicle body adjacent a wheel opening and extending outwardly from a surface of the portion of the vehicle body; and
    a shock absorber mount having a recess to receive one of the protrusions during assembly of a vehicle having the vehicle body to facilitate attachment of a shock absorber to the portion of the vehicle body, the portion of the vehicle body including attachment bosses to receive fasteners to fix the shock absorber to the portion of the vehicle body.

12. The apparatus of claim 11, wherein the shock absorber mount further includes apertures to receive the fasteners, the fasteners to be coupled to the attachment bosses to attach the shock absorber to the portion of the vehicle body.

13. The apparatus of claim 11, wherein the portion of the vehicle body is a longitudinal structural member.

14. The apparatus of claim 13, wherein the longitudinal structural member is coupled to a floor assembly of the vehicle.

15. The apparatus of claim 11, wherein the protrusions are ribs extending outwardly and substantially perpendicular to a longitudinal axis of the vehicle body.

16. A method comprising:
    coupling a first longitudinal structural member to a body of a vehicle adjacent a wheel arch area of the body;
    integrally forming a first locating rib in the first longitudinal structural member, the first locating rib to position a shock absorber of a chassis of the vehicle during assembly of the body to the chassis; and
    integrally forming a first attachment boss in the first longitudinal structural member adjacent to the first locating rib, the first attachment boss to receive a first fastener to fasten the shock absorber to the body.

17. The method of claim 16, further including integrally forming a second locating rib in the first longitudinal structural member and spaced from the first locating rib, the first and second locating ribs to position the shock absorber during assembly of the body to the chassis.

18. The method of claim 16, further including integrally forming a second attachment boss in the first longitudinal structural member spaced from the first attachment boss, the second attachment boss to receive a second fastener to fasten the shock absorber to the body.

19. The method of claim 16, further including disposing the first locating rib adjacent and above the first attachment boss.

* * * * *